United States Patent [19]
Pitt et al.

[11] Patent Number: 5,717,934
[45] Date of Patent: Feb. 10, 1998

[54] SEQUENTIAL COMPUTER NETWORK SHUTDOWN SYSTEM AND PROCESS THEREFOR

[75] Inventors: Ronald L. Pitt, Escondido; Carleton H. Smith, San Diego, both of Calif.

[73] Assignee: Deltec Electronics Corporation, San Diego, Calif.

[21] Appl. No.: 330,697

[22] Filed: Oct. 28, 1994

[51] Int. Cl.$^6$ .................... G06F 1/30; G06F 13/10
[52] U.S. Cl. .................... 395/750; 395/182.22; 395/651
[58] Field of Search .................... 395/750, 182.22, 395/650; 364/707

[56] References Cited

U.S. PATENT DOCUMENTS

| | | | |
|---|---|---|---|
| 4,495,568 | 1/1985 | Gilbert et al. | 395/182.2 |
| 4,611,289 | 9/1986 | Coppola | 364/492 |
| 4,663,539 | 5/1987 | Sharp et al. | 307/38 |
| 5,053,635 | 10/1991 | West | 307/67 |
| 5,117,324 | 5/1992 | Johnson, Jr. | 361/66 |
| 5,151,855 | 9/1992 | Gray et al. | 395/750 |
| 5,168,444 | 12/1992 | Cukor et al. | 364/401 |
| 5,287,515 | 2/1994 | Murai | 395/700 |
| 5,315,161 | 5/1994 | Robinson et al. | 307/66 |
| 5,317,752 | 5/1994 | Jewett et al. | 395/750 |
| 5,323,393 | 6/1994 | Barrett et al. | 370/85.8 |
| 5,381,554 | 1/1995 | Langer et al. | 395/750 |
| 5,483,656 | 1/1996 | Oprescu et al. | 395/750 |
| 5,542,035 | 7/1996 | Kikinis et al. | 395/750 |

*Primary Examiner*—Jack B. Harvey
*Assistant Examiner*—Sumati Lefkowitz
*Attorney, Agent, or Firm*—Lewis B. Sternfels

[57] ABSTRACT

A user configurable, rule based sequencing of the shutdown of individual devices or the entire computer network is forwarded to a collection of software programmed microprocessors operating on the network. Every required device of the system is provided with shutdown software and a conventional UPS (known variously as an uninterruptable power supply, uninterruptable power system, uninterrupted power supply, and uninterrupted power system). A user interface program is used by a system administrator to configure the operation of the shutdown software. In the preferred embodiment, the network system includes, at a minimum, a file server coupled to a storage device containing a database, a database server, and at least one database work station, such as used for accounting purposes. Shutdown software and a UPS are coupled or otherwise associated with each of the file server, the database server, the work station and, when used, the network communication device. The user interface program establishes the configuration process. The shutdown software establishes the shutdown process. The configuration process is installed to configure the system and to establish rules or a system administrator's plan. The software validates the rules for error and inconsistencies, such as may have been made by the administrator. If there are any errors and inconsistencies, the system administrator is so advised and corrections are recommended. If there are no errors or inconsistencies, the user interface program or software is permitted to communicate the system administrator's plan to all shutdown software running on the individual devices. The shutdown process follows the rules in the configuration process.

13 Claims, 4 Drawing Sheets

Microfiche Appendix Included
(1544 Microfiche, 16 Pages)

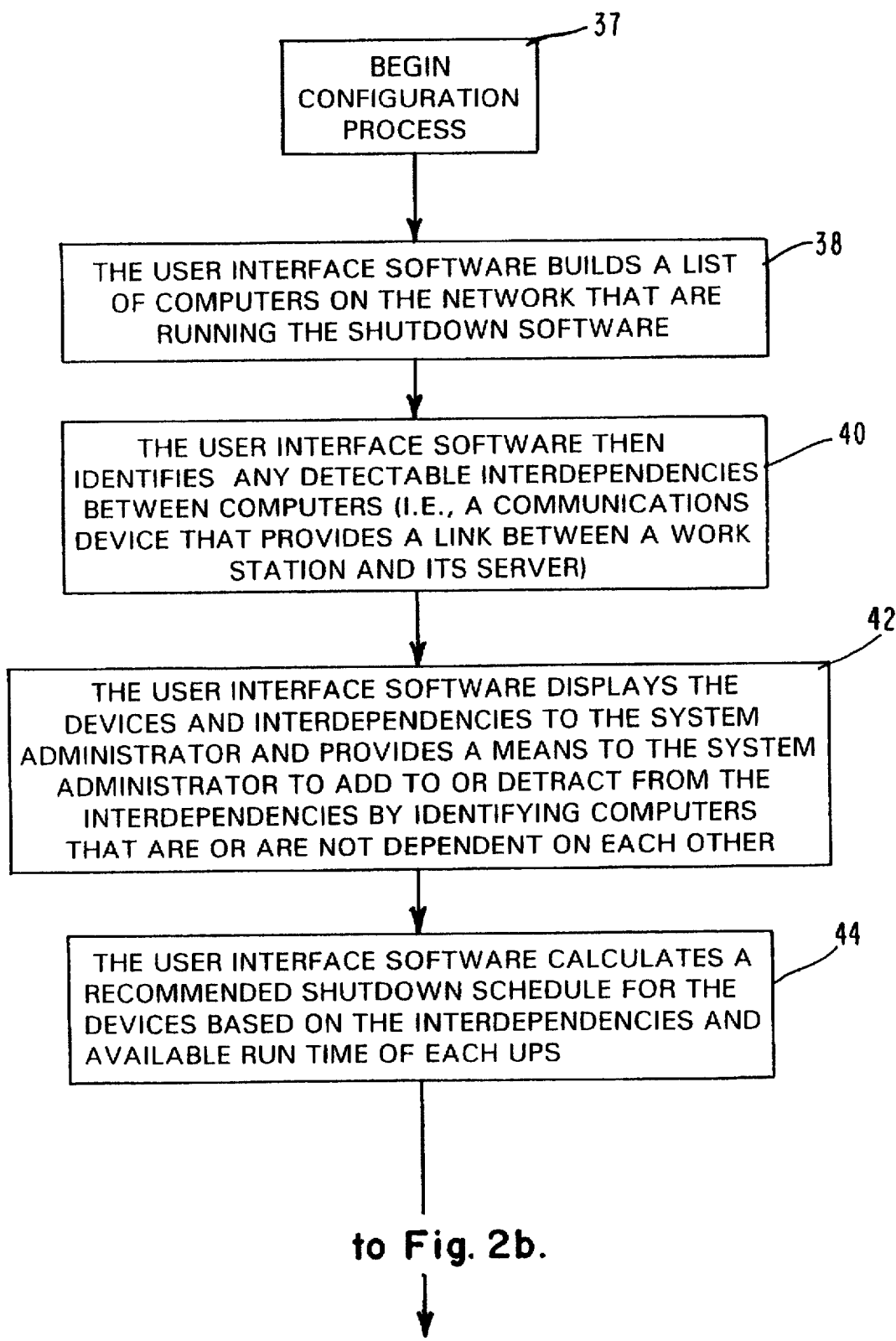

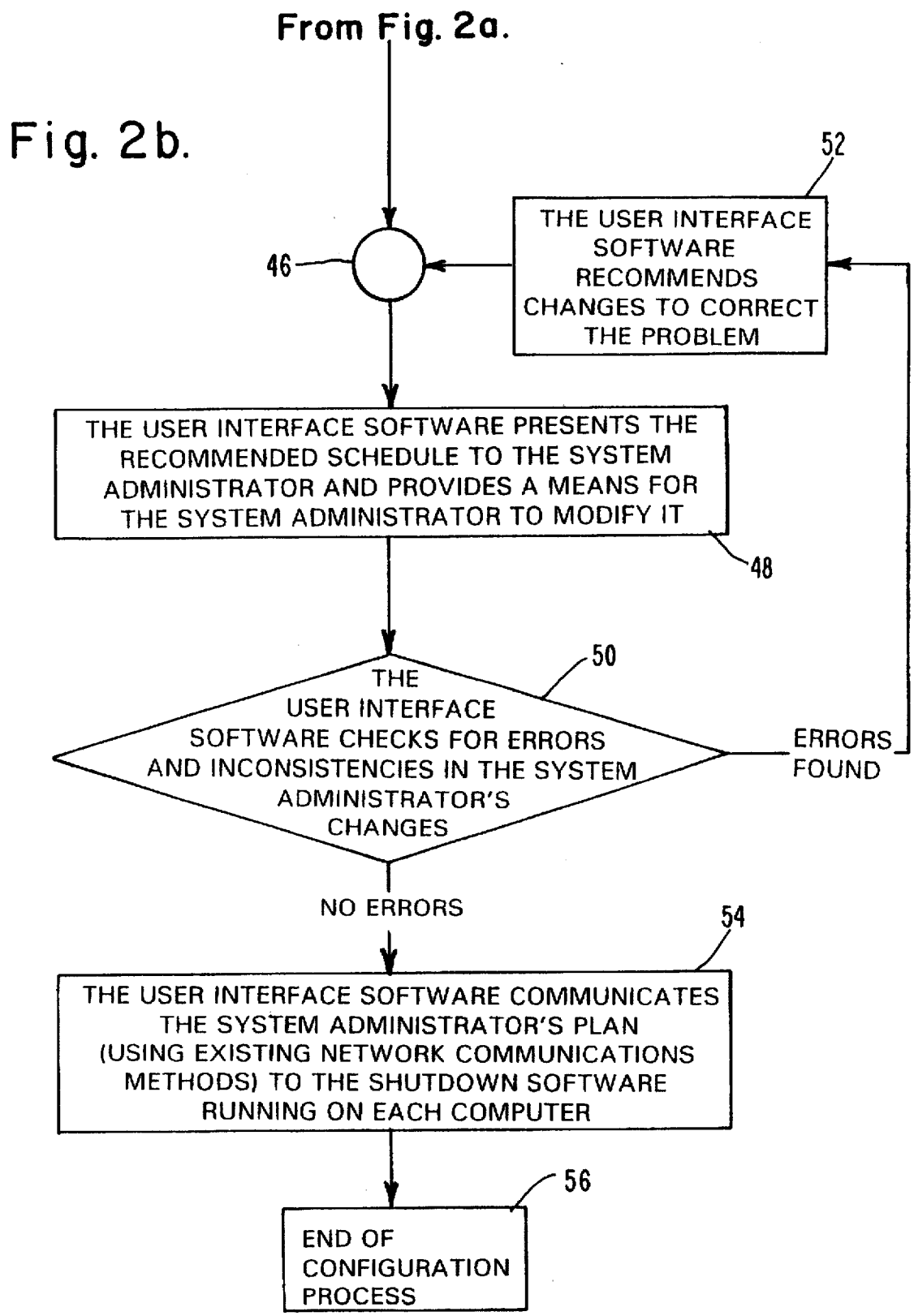

SEQUENTIAL COMPUTER NETWORK SHUTDOWN SYSTEM AND PROCESS THEREFOR

REFERENCE TO MICROFICHE APPENDIX

Attached hereto and incorporated herein is microfiche Appendix A. Appendix A is the source code for the "C" and "Assembler" language computer programs which program (configure) the processors and computers disclosed herein to implement the methods and procedures described herein. Appendix A consists of 1 title page and 16 fiches. This source code is subject to copyright protection. The copyright owner has no objection to the facsimile reproduction of the patent disclosure, as it appears in the Patent and Trademark Office patent files or records, but otherwise reserves all copyright rights whatsoever.

BACKGROUND OF THE INVENTION

1. Field of the Invention

The present invention relates to a sequential computer network shutdown system and process therefor and, in particular, to a collection of software programs operating on a computer network and providing a user configurable, rule based sequencing of the shutdown of individual devices in the computer network.

2. Description of Related Art and Other Considerations

When shutting down a computer network, it is important that no portion or segment of the network be in a condition of instability at the time of shutdown, so as not to destroy or corrupt or otherwise deleteriously affect any data in the network, wherever it may be located. This requirement exists for all computer networks, whether a local area network (LAN), a wide area network (WAN), a network encompassing an entire organization (enterprise), or a collection of networks (internet).

Regardless of its type, a conventional computer network includes two or more computers connected to a common data transmission line. As an option, network communication devices can be used as part of the common data transmission line.

Of the several problems that may arise when the network or any portion or part of it is shut down, that is, when the whole system or a subset of the system is to cease operation, the following situation is considered by many practitioners to be the most common. At the point of shutdown, data often is in transmission from one part of the network to another and, if care is not taken, the data may be lost or corrupted or be placed in an unpredictable form. For example, a database server may be transmitting portions of the data to a computer at a work station in response to a request at that work station, or that database server may be a work station of a file server and, on its part, be a server to other work stations. In this scenario, the database server requests the file server to obtain data from the storage device. The data is then transmitted to the database server for processing and subsequent transmission to the work station. The work station processes the received data, and the processed data is then returned to the database server for storage. The database server will then process the data and transmit it to the storage device by means of the file server. If shutdown occurs at any point prior to completion of this cycle, the data is often deleteriously affected and may no longer be in usable condition or, at least, usable with any degree of confidence.

Accordingly, upon shutdown and to avoid such deleterious changes in updating data or in transmission of data to or from any computer in the network, specific operations must occur in the following sequence. First, all work stations must be shut down. Second, the database server, prior to its shutdown, must complete that portion of the update to transmit the updated data to the file server. Third, the file server must store the data; only then can it be shut down. If these operations are followed in sequence, when the network is later powered up, all data will then be found to have remained in a predictable manner and can be used with confidence. Without such a sequential shutdown sequence, predictability cannot be assured, and no known system for sequential network shutdown has been devised until conception of the present invention.

SUMMARY OF THE INVENTION

The present invention successfully addresses and overcomes this and other related problems by providing a user configurable, rule based sequencing of the shutdown of individual devices or the entire computer network. This sequencing is forwarded to a collection of software programmed microprocessors operating on the network.

To enable use of the present invention, every required device of the system is provided with shutdown software, as defined by the present invention, and a conventional UPS. The term "UPS" is an acronym which is variously used in the trade to mean uninterruptable power supply, uninterruptable power system, uninterrupted power supply, and uninterrupted power system. Because of this varied use in terminology, this power supply or system will be referred to hereinafter simply by its "UPS" acronym. A user interface program is used by a system administrator according to the principles of the present invention to configure the operation of the shutdown software.

More specifically, in the preferred embodiment of the present invention, its network system includes, at a minimum, a file server coupled to a storage device containing a database, a database server, and at least one database work station, such as used for accounting purposes. Shutdown software and a UPS are coupled or otherwise associated with each of the file server, the database server, the work station and, when used, the network communication device.

The user interface program establishes the configuration process. The shutdown software establishes the shutdown process. The configuration process is installed to configure the system and to establish rules or a system administrator's plan. The software validates the rules for error and inconsistencies, such as may have been made by the administrator. If there are any errors and inconsistencies, the system administrator is so advised and corrections are recommended. If there are no errors or inconsistencies, the user interface program or software is permitted to communicate the system administrator's plan to all shutdown software running on the individual devices. The shutdown process follows the rules in the configuration process.

More specifically, when the user interface program is run, several tasks are performed.

First, the system is configured (a) to specify the order of shutdown and (b) the timing that shutdown is to take effect. As a shutdown plan, the system administrator devises this plan as configuration software for any reason of shutdown, e.g., in the event of a power failure or a manual shutdown or a schedule of times when the system is to be turned off, such as during a weekend. The configuration is rule based, that is, it is implemented to set up rules, depending upon the shutdown situation envisioned. These rules are designed to afford the system administrator the flexibility to set up his or her own rules but, on the other hand, the software is sufficiently intelligent to alert the system administrator if the proposed rules or configuration will not become, or create a problem in itself.

Second, a manual shutdown is set up and used on an ad hoc basis should the system administrator wish to bring the system down. This operation follows the rules established by the configuration. When the manual shutdown occurs, the following options are made available: (a) the system is shut down indefinitely until manually rebooted, that is, physically turned off and then turned on; (b) the system is shut down for a specified period of time after which it is powered up; and (c) the system is rebooted. In any of these situations, a UPS must be attached to each device in order that the shutdown instructions be properly performed.

Several advantages are derived from this arrangement. A sequential order of shutdown is established. Predictability in shutdown is assured. Deleterious changes in updating the database or in transmission of data to or from the work station are avoided during shutdown, whether through power failure or manual shutdown or timed schedules when the system is to be turned off.

Other aims and advantages, as well as a more complete understanding of the present invention, will appear from the following explanation of an exemplary embodiment and the accompanying drawings thereof.

BRIEF DESCRIPTION OF THE DRAWINGS

FIG. 2 is a procedure outlining a configuration process; and

DETAILED DESCRIPTION OF THE PREFERRED EMBODIMENTS

Figure 1:
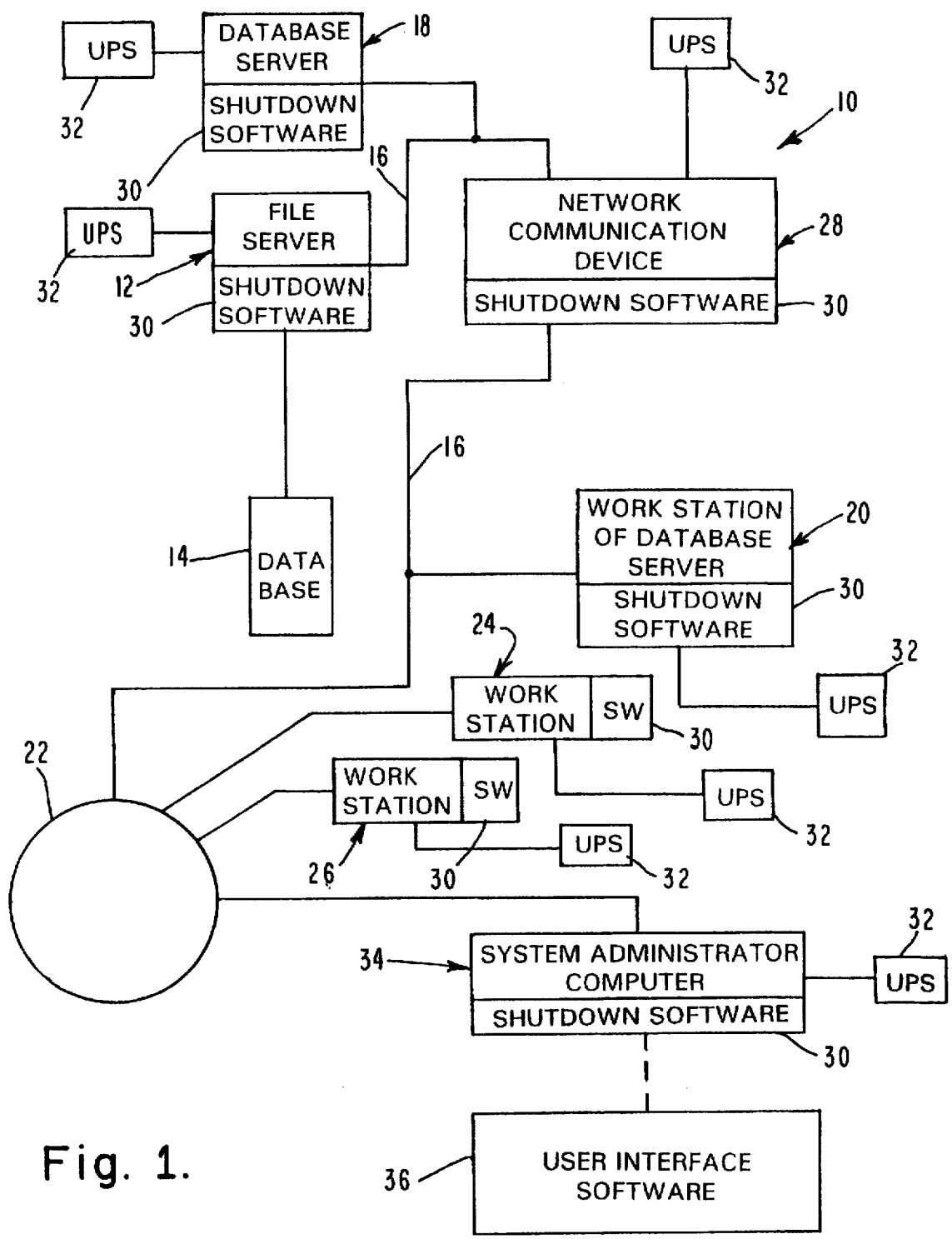
FIG. 1 is diagrammatic view of the preferred embodiment of the present invention comprising a computer network of any size, whether LAN, WAN, enterprise or internet.

As shown in FIG. 1, the preferred embodiment of the present invention comprises a computer network or system 10 which is configured as any of a local area network (LAN), a wider area network (WAN), a network encompassing an entire organization (enterprise), or a collection of networks (internet).

System 10 preferably includes a file server 12 to which a storage device 14 containing a database is coupled. File server 12 is coupled by an interconnecting link 16 of electromagnetic energy to other parts or portions of system 10. Link 16 may be a group of communication types, such as hardwired, radio and satellite. Such other parts or portions include a database server 18, a work station 20 of database server 18, and another computer network 22 which, in turn, may include its own work stations 24, 26 and 34 and/or servers. Optionally, if desired, a network communication device 28 is coupled as an interconnection link 16.

Each of file server 12, database server 18, work stations 20, 24 and 26, and network communication device 28 have their own, shutdown software 30 and UPS 32. As previously stated, the term "UPS" is an acronym for uninterruptable power supply, uninterruptable power system, an uninterrupted power supply, and uninterrupted power system. Each UPS 32 has its own self-supporting power supply, such as a battery or generator, and is a product of conventional formulation and construction, as are system 10, file server 12, database 14, interconnecting device 16, database server 18, work stations 20, 24 and 26, and network communication device 28. Existing communications are used, regardless of the type of computer network set up, e.g., by IEEE Standard 802.3.

A system administrator computer 34 is coupled to network 22, although the coupling may be anywhere in system 10, such as to interconnection 16. The system administrator at his computer 34 uses a user interface program 36 to define a shutdown configuration, as will be more fully explained hereinafter with respect to FIGS. 2 and 3. The configuration permits shutdown which can be effected manually or by a power failure or according to a timed schedule.

As illustrated in FIG. 2, the configuration process is established by use of the user interface software program. This program will vary, depending upon the particular type of network with which it will be employed and, therefore, is tailored by the programmer, using conventional programming methods, to the particular network. Thus, there will be as many different interface programs as there are types of networks.

The configuration process is created in a series of steps, as follows. As shown in the step displayed in enclosure 38, the user interface software builds or compiles a list of computers on the network that are running the shutdown software depicted in FIG. 3. Specifically, the user interface software examines the network and creates an inventory of its components, in particular, its computers.

Then, as disclosed in step 40, the user interface software identifies any detectable interdependencies between the computers, such as a communications device, e.g., network communications device 28 shown in FIG. 1 to provide a link between a work station and its server.

As disclosed in step 42, the user interface software displays the devices and interdependencies to the system administrator and provides a medium by which the system administrator can interface with the user interface software to add to or detract from the interdependencies by identifying those computers that are or are not dependent upon each other.

The user interface software, as denoted by step 44, then calculates a recommended shutdown schedule for each computer or device to be shut down, as based upon the interdependencies and available run times afforded by the several power storage capabilities of each UPS coupled to the device to be shut down.

This information is then fed through a connection 46 to a step, as denoted by enclosure 48, by which the user interface software presents the recommended schedule to the system administrator and provides a medium for the system administrator to modify the schedule, should such modification be judged to be necessary.

The user interface software, as shown in decision enclosure 50, then checks the schedule for errors and inconsistencies in the system, whether modified or not by the system administrator. An example of an inconsistency would be the shutdown of a server prior to the shutdown of its work stations. An example of an error would be the shutdown during a power failure having a longer duration than the UPS is capable of supporting. If any errors and inconsistencies exist, the user interface software recommends changes to correct this error/inconsistency problem, as stated in step 52, and these changes are fed back to the systems administrator through connector 46 to step 48 for appropriate corrections to be made.

When no or any further errors or inconsistencies are detected, the system administrator's plan is communicated, as illustrated in step 54 and by using existing network communications methods, to the shutdown software 30 running on each computer in system 10. This then completes the configuration process, as indicated by enclosure 56.

Figure 3:
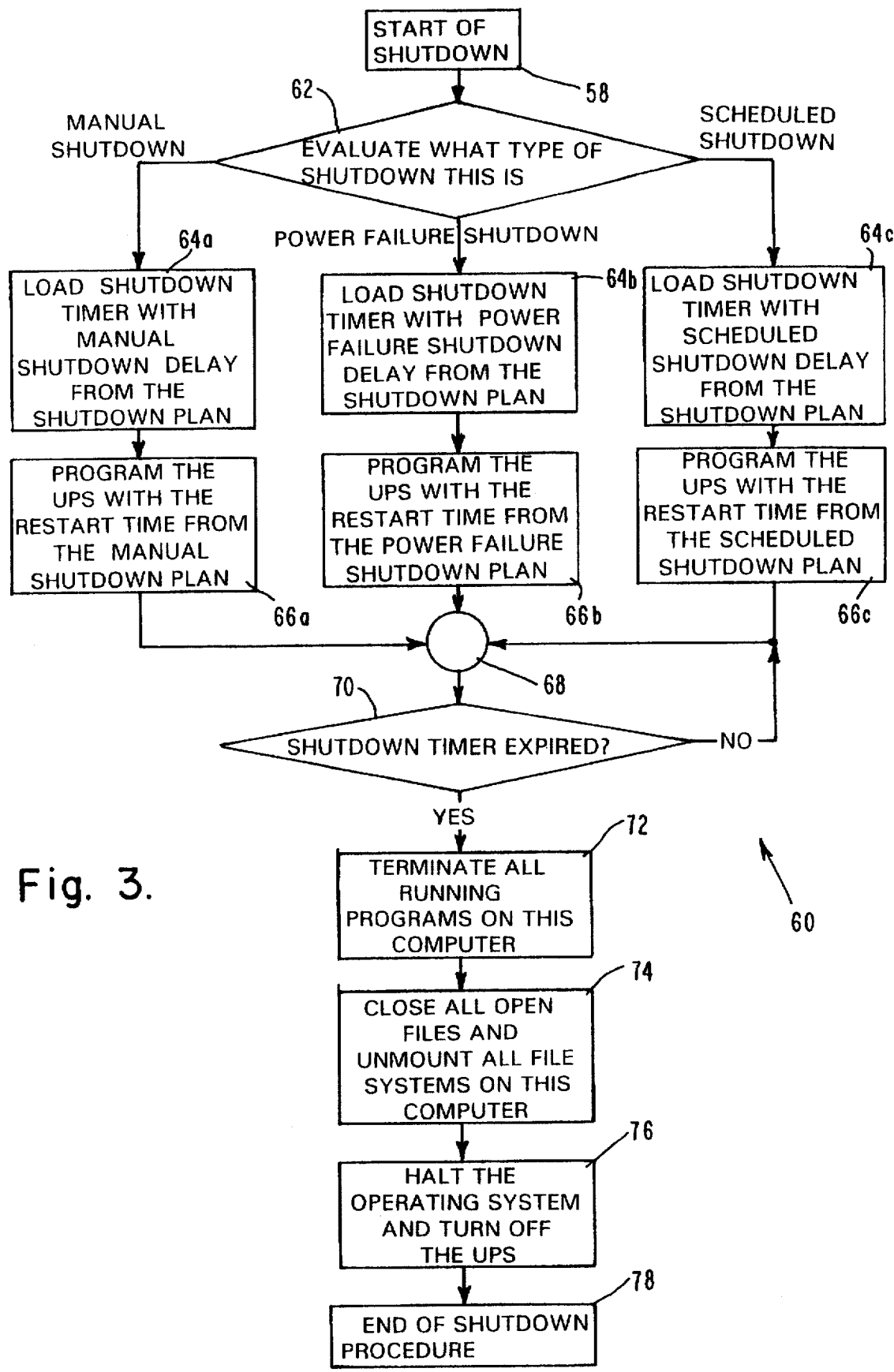
FIG. 3 is a procedure outlining a shutdown process.

Prior to the time that the system is or needs to be shut down, shutdown software 30 for each computer is configured with the process generally shown in FIG. 3. Specificity in the process is dependent, for example, upon the type of shutdown involved and the type of computer involved, e.g., work station or server.

Shutdown commences, as denoted by enclosure 58 by such events or circumstances as by manual activation, by a power failure or by a schedule. The particular event is perceived by the shutdown software which is generally indicated by bracket 60, in particular, that part of the software, as indicated by decision 62, by which the type of shutdown is evaluated.

Based upon the evaluation, for example, if shutdown has occurred manually, by a power failure or by scheduling, a shutdown timer is loaded with a shutdown delay corresponding to the type of shutdown evaluated, as denoted by one of steps 64a, 64b and 64c. Thereafter, as shown in steps 66a, 66b and 66c, UPS 32 of the computer, whether server, work station, system administrator or other, is programmed with the restart time from the rules or system administrator's plan established in the configuration step.

The instructions from the appropriate programming are then fed to a common point or connector, as denoted by connector 68.

Expiration of the shutdown timer is detected as indicated by decision enclosure 70. If the time has not expired, the sequence is recycled to connector 68 until the time has expired.

When the shutdown timing has expired, all running programs on the computer are terminated, as shown by step 72. Thereafter, as denoted by step 74, all open files in this computer are closed, and all file systems thereon are unmounted. Finally, the operating system is halted and that computer's UPS is turned off, as shown by step 76, leading to completion of the shutdown procedure for that computer, as denoted by enclosure 78.

Therefore, when shutdown of the network actually occurs, each computer has its software programmed instructions already in place in a running computer. If shutdown is manual, the user interface software sends messages through the network to the shutdown software in the respective component computers. If shutdown is a power failure, the UPS of the several computers detects this event to commence each computer's shutdown. If shutdown is scheduled, the shutdown software itself determines that the time has come to begin shutdown. Thus, regardless of the particular cause of shutdown, each computer continues to run from its own power supply in its UPS for the time set by the instructions preprogrammed in its own software 30, and shuts down at the conclusion of the set time period. Accordingly, for example, a computer at a work station is timed to continue to run and then shut down prior to the shutdown of a server. Because all computers are so shut down in the preprogrammed sequence, when the network is later powered up, all data will then be found to have remained in a predictable manner and can be used with confidence.

Although the invention has been described with respect to a particular embodiment thereof, it should be realized that various changes and modifications may be made therein without departing from the spirit and scope of the invention.

APPENDIX A

Appendix A in Microfiche form consisting of 1 title page and 16 fiches containing the images of the source code.

This source code is subject to copyright protection. The copyright owner has no objection to the facsimile reproduction of the patent disclosure, as it appears in the Patent and Trademark Office patent files or records, but otherwise reserves all copyright rights whatsoever.

What is claimed is:

1. An automated sequential shutdown system method for a computer network including at least one computer at a work station having an uninterruptable power supply (UPS) and a power storage capability therefor and at least one server computer having a UPS and a power storage capability therefor connected to a common data transmission line, for establishing a configuration using user interface software, comprising the steps of using the user interface software for:

compiling a list of the computers on the network that are running shutdown software to create an inventory of the network components;

identifying any detectable interdependencies between the computers;

displaying the computers and interdependencies to a system administrator to provide a medium in accordance with a plan by which the system administrator can interface with the user interface software to add to or detract from the interdependencies by identifying those computers that are or are not dependent upon each other;

calculating a recommended shutdown schedule for each computer or device to be shut down, as based upon the interdependencies and available run times afforded by the several power storage capabilities of each UPS coupled to the device to be shut down;

feeding the schedule through a connection for presenting the recommended schedule to the system administrator and for providing a medium for the system administrator to effect any desired modification of the schedule;

checking the schedule for errors and inconsistencies in the system;

if any errors and inconsistencies exist, recommending changes to correct any such error and inconsistency problem, and feeding these changes back to the system administrator through the connection for appropriate corrections to be made;

when no or any further errors or inconsistencies are detected, communicating the system administrator's plan by use of existing network communications methods to the shutdown software running on each computer in the network.

2. An automated sequential shutdown system method according to claim 1 in which the computer network has at least two computers and uninterruptable power supplies (UPS's) respectively associated therewith, further comprising the steps of:

establishing rules in the computers according to the system administrator's plan by which system shutdown is sequentially configured for each computer and its interrelationship among the other computers; and following the rules when shutdown occurs.

3. An automated sequential shutdown system method according to claim 1, for use in a computer network including at least one computer at a work station and at least one server computer connected to a common data transmission line, and a UPS with a self-contained power supply coupled to each of the computers, further comprising the steps of supplying shutdown software for each of the computers and providing each of the shutdown software with respective ones of the shutdown rules corresponding to types of shutdown envisioned and times for shutting down each of the computers.

4. An automated sequential shutdown system method according to claim 1, further comprising the steps of:

establishing rules in the computers according to the system administrator's plan by which system shutdown is sequentially configured for the computers, in which said rules establishing step comprises the step of calculating a schedule of times for shutting down the computers in a timed sequence to maintain all data therein in a predictable manner for later use with confidence;

supplying shutdown software for each of the computers;

providing each of the shutdown software with respective ones of the shutdown rules corresponding to types of shutdown envisioned and times for shutting down each of the computers; and following the rules when shutdown occurs.

5. An automated sequential shutdown system method according to claim 4 in which said calculating step comprises the steps of:

permitting modification of the schedule by a system administrator;

checking the schedule for errors and inconsistencies; and correcting the schedule if any errors or inconsistencies are found.

6. An automated sequential shutdown system method according to claim 5 in which said rules following step comprises, for each computer and its associated UPS, the steps of:

detecting a shutdown;

evaluating the type of shutdown;

loading a shutdown timer with a shutdown delay corresponding to the type of shutdown evaluated;

programming the UPS with a restart time from the shutdown rules;

detecting if expiration of the shutdown timer has occurred;

if the shutdown timer has expired, terminating all running programs on the computer in which a program is running;

closing all files and unmounting all file systems on the computer; and halting the system and turning off the UPS.

7. An automated sequential shutdown system method according to claim 1, for use in a computer network having (1) parts connected to a common data transmission line including (a) a file server coupled to a storage device containing a database, (b) a database server, and (c) at least one database work station, (2) an optional network communication device in the common data transmission line, and (3) UPS and shutdown software associated with the file server, the database server, the work station and the network communication device, in which said step for following the rules when shutdown occurs comprises the step of executing the rules at the time of shutdown to each one of the file server, database server, work station and optional network communication device in sequential shutdown order as established by said rules establishing step.

8. An automated sequential shutdown system method according to claim 1 in which said rules establishing step includes the steps of validating the rules for any error and inconsistency therein, correcting the rules should any such error and inconsistency exist, and thereafter permitting communication of the rules to shutdown software coupled to individual devices in the network.

9. An automated sequential shutdown system method according to claim 8, for use in a computer network having (1) parts connected to a common data transmission line including (a) a file server coupled to a storage device containing a database, (b) a database server, and (c) at least one database work station, (2) an optional network communication device in the common data transmission line, and (3) UPS and shutdown software associated with the file server, the database server, the work station and the network communication device, in which said step for following the rules when shutdown occurs comprises the step of executing the rules at the time of shutdown to each of the file server, database server, work station and optional network communication device in sequential shutdown order as established by said rules establishing step.

10. An automated sequential shutdown system method according to claim 10, further comprising the steps of:

detecting a shutdown;

evaluating the type of shutdown;

loading a shutdown timer with a shutdown delay corresponding to the type of shutdown evaluated;

programming the UPS with a restart time from the shutdown plan;

detecting if expiration of the shutdown timer has occurred;

if the shutdown timer has expired, terminating all running programs on the computer in which a program is running;

closing all files and unmounting all file systems on the computer; and halting the system and turning off the UPS.

11. An automated sequential shutdown system method according to claim 10, further comprising the steps of:

establishing rules in the computers according to the system administrator's plan by which system shutdown is sequentially configured for the computers, said rules establishing step comprising the step of calculating a schedule of times for shutting down the computers in a timed sequence to maintain all data therein in a predictable manner for later use with confidence; and following the rules when shutdown occurs.

12. An automated sequential shutdown system method according to claim 11 in which said calculating step comprises the steps of:

permitting modification of the schedule by a system administrator;

checking the schedule for errors and inconsistencies; and correcting the schedule if any errors or inconsistencies are found.

13. An automated sequential shutdown system method according to claim 12 in which said rules following step comprises, for each computer and its associated UPS, the steps of:

detecting a shutdown;

evaluating the type of shutdown;

loading a shutdown timer with a shutdown delay corresponding to the type of shutdown evaluated;

programming the UPS with a restart time from the shutdown rules;

detecting if expiration of the shutdown timer has occurred;

if the shutdown timer has expired, terminating all running programs on the computer;

closing all files and unmounting all file systems on the computer; and halting the system and turning off the UPS.

* * * * *